(No Model.) 2 Sheets—Sheet 1.

P. L. DERMIGNY.
COOLER AND FREEZER.

No. 455,663. Patented July 7, 1891.

WITNESSES:
Chas. Nica.
C. Sedgwick.

INVENTOR:
P. L. Dermigny
BY Munn & Co.
ATTORNEYS (No Model.) 2 Sheets—Sheet 2.

P. L. DERMIGNY.
COOLER AND FREEZER.

No. 455,663. Patented July 7, 1891.

WITNESSES:
Chas. Nida.
E. Sedgwick

INVENTOR:
P. L. Dermigny
BY
Munn & Co.
ATTORNEYS

UNITED STATES PATENT OFFICE.

PAUL L. DERMIGNY, OF NEW YORK, N. Y.

COOLER AND FREEZER.

SPECIFICATION forming part of Letters Patent No. 455,663, dated July 7, 1891.

Application filed December 31, 1890. Serial No. 376,321. (No model.)

*To all whom it may concern:*

Be it known that I, PAUL L. DERMIGNY, of the city, county, and State of New York, have invented a new and Improved Cooler and Freezer, of which the following is a full, clear, and exact description.

The invention relates to cooling and freezing apparatus such as shown and described in the United States Letters Patent No. 415,901, granted to me November 26, 1889.

The object of the present invention is to provide a new and improved cooler and freezer more especially intended for family use, which is simple and durable in construction, and serves to cool or freeze water and other liquids, or to make ice-cream and like articles.

The invention consists of certain parts and details and combinations of the same, as will be described hereinafter, and then pointed out in the claims.

Reference is to be had to the accompanying drawings, forming a part of this specification, in which similar letters of reference indicate corresponding parts in all the figures.

Figure 1:
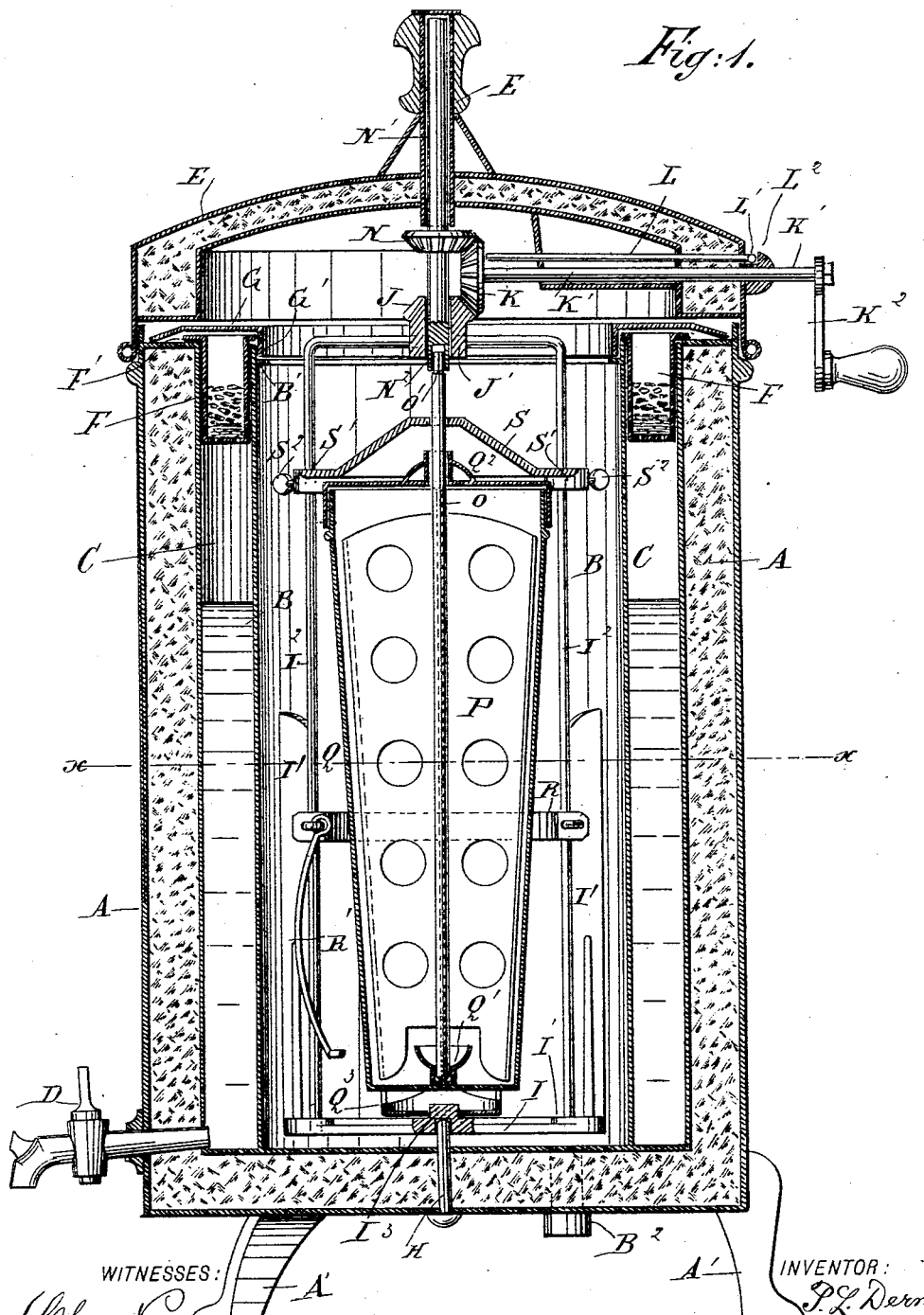
Figure 2:
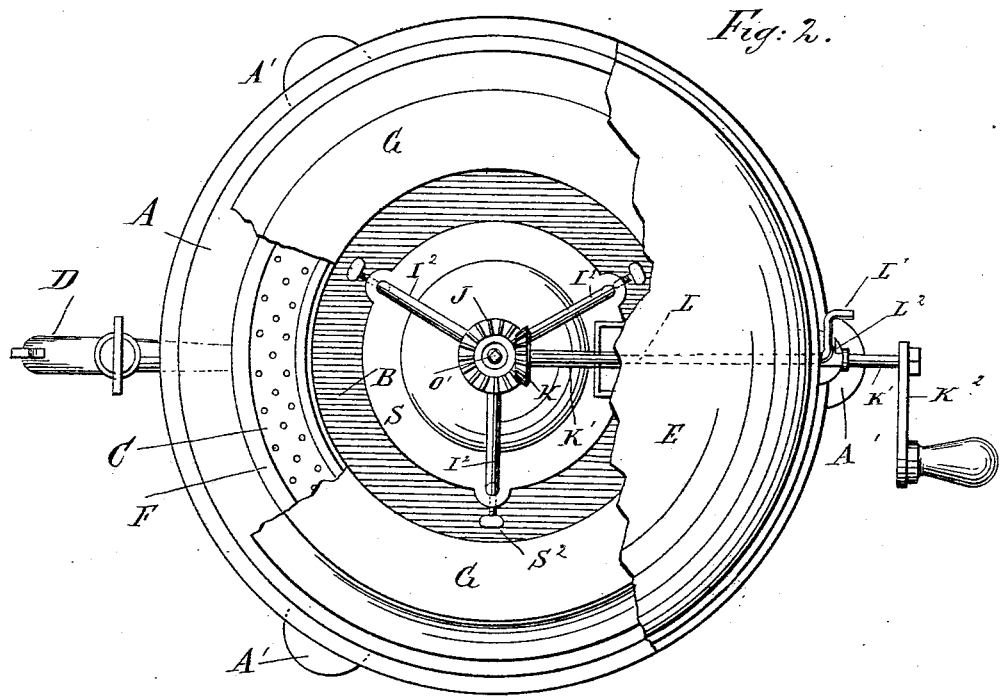
Figure 3:
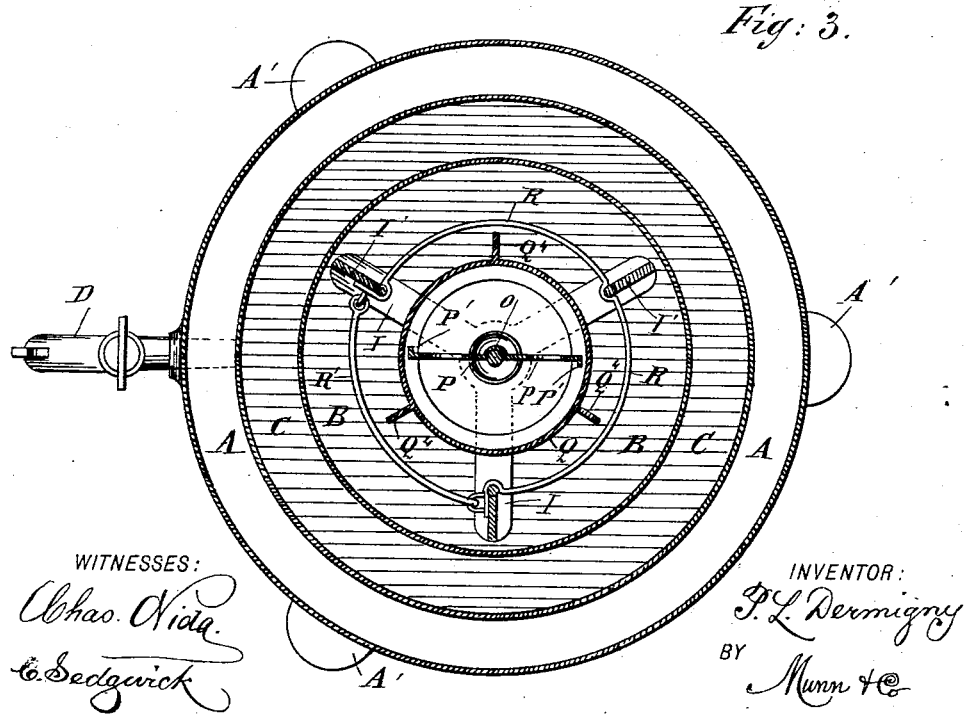

Figure 1 is a sectional side elevation of the improvement. Fig. 2 is a plan view of the same with parts broken out, and Fig. 3 is a sectional plan view of the same on the line $x\ x$ of Fig. 1.

The improved cooling and freezing apparatus is provided with an outer receptacle A, mounted on suitable legs A', and containing an inner receptacle B, which forms with the inner surface of the outer receptacle a chamber C, containing the water or other liquid to be cooled or frozen. The liquid in the chamber C can be drawn off from the bottom through a faucet D or by other suitable means. The upper end of the receptacle A is adapted to be closed by a cover E, preferably made with double walls filled in with a non-conducting material, the receptacle A being made in a similar manner. The upper open end of the chamber C is adapted to be closed by a ring-shaped filter F, formed with a flange F', resting on the top of the casing A, so as to support the filter. The bottom of the filter is perforated, and in the filter itself is placed a layer of asbestus, resting on top of the perforated bottom, and on top of the asbestus is placed a layer of coal, on which the liquid to be filtered is poured to percolate through the coal and asbestus and the perforated bottom into the chamber C. The open end of the filter F is adapted to be closed by a cover G, resting on top of the receptacle A and made in the shape of a ring, formed at its inner edge with a downwardly-extending annular flange G', fitted on the inside of the casing B and resting on the annular flange B' thereof, as is plainly illustrated in Fig. 1. The freezing mixture contained in the inner receptacle B is prevented from splashing upward by the annular flange B'.

In the bottom of the receptacle A and in the center thereof is secured a pivot-pin H, extending centrally into the receptacle B, as is plainly shown in Fig. 1. On the inner end of this pin H is mounted to turn a horizontally-extending spider I, provided with upwardly-extending wings or arms I', serving to agitate the freezing mixture. From the wings I' rods $I^2$ extend upward and inward at their upper ends to connect rigidly with the hub J' of the bevel gear-wheel J, adapted to mesh into a bevel gear-wheel K, secured on a horizontally-extending shaft K', mounted to turn and to slide in suitable bearings formed in the cover E. The shaft K' extends to the outside of the cover, and is provided at its outer end with a crank-arm $K^2$ for conveniently turning the shaft K' so as to rotate the bevel gear-wheel K, which, when meshing into the bevel gear-wheel J, rotates the latter, and consequently imparts a rotary motion to the rods $I^2$, the arms I', and the spider I. The gear-wheel K and its shaft K' can be locked in an innermost position by means of a rod L, mounted to slide in the cover E and adapted to abut at its inner end against the face of the bevel gear-wheel K. The outer end of the rod L is provided with an angular arm L', adapted to engage a notch in a projection $L^2$, formed on the outside of the cover E. When the angular arm L' is thrown in a vertical position, the rod L can be moved outward, so as to permit of sliding the shaft K' in a similar direction to disengage the gear-wheel K from the bevel gear-wheel J. When the shaft K' and its gear-wheel K are in an innermost position, as shown in Fig. 1, and the rod L is moved in a like position and the arm L' is turned into the notch of the projection L², then the shaft K' is locked in position and the gear-wheel K remains in mesh with the bevel gear-wheel J. The bevel gear-wheel K also meshes into a bevel gear-wheel N, arranged above the bevel gear-wheel J and secured on a shaft N', the upper part of which extends into a bearing E', formed in the middle of the cover E. The lower part of the shaft N' passes loosely through the gear-wheel J and its hub J', and is provided in its lower end with a square recess N², engaging a square offset O', formed on the upper end of a shaft O, provided with perforated wings P, each having at its outer end a flange P'. The lower end of the shaft O is mounted to turn in a step Q', formed in the inside of a receptacle Q, adapted to contain substances for making ice-cream or other similar articles. The receptacle Q is made in the shape of an inverted truncated cone and is closed on top by a cover Q², forming the bearing for the upper part of the shaft O. The receptacle Q is provided on the under side of its bottom with a bearing Q³, fitted loosely on a hub I³, formed on top of the spider I. The receptacle Q may be entirely omitted, so that the shaft O, with its wings P, turns in the freezing mixture, and in an opposite direction to the spider I and its agitating-arms I' and rods I². In case the receptacle Q is omitted, the lower end of the shaft O is mounted to turn in a step formed in the hub I³. The receptacle Q remains stationary, while the wings P rotate in one direction within the receptacle and the wings I' rotate on the outside of the receptacle in an opposite direction. The wings I' and rods I² are so arranged that the receptacle Q can be readily inserted within the said wings and rods.

In order to prevent the receptacle from being displaced within the rods and wings, a band R is provided which connects the three rods with each other, and a hook R' is also provided, which is pivoted on one of the wings I' and extends in front of the receptacle Q to be hooked onto the next following wing I', so that the said hook R' and the band R extend all around the receptacle Q. (See Fig. 3.)

In order to hold the cover Q² of the receptacle Q in place, a cap or collar S is provided, having lugs S' fitted to slide on the rods I². Set-screws S² screw in the said lugs S' against the said rods I² to hold the said cap or collar in place over the cover Q² to prevent the displacement of the latter. When it is desired to remove the receptacle Q, the operator loosens the set-screws S², moves the cap or collar S upward on the rods I², and then locks it in an uppermost position by screwing up the set-screws. The operator then unhooks the hook R', after which the receptacle Q can be taken out.

The operation is as follows: When the several parts are in the position shown in Fig. 1 and the liquid has been filtered through the filter F into the receptacle C and the freezing mixture is contained within the inner receptacle B, then this liquid in the chamber C can be readily cooled or frozen as soon as the operator turns the crank-arm K² to revolve the agitators. Turning of the shaft K' rotates the bevel gear-wheel K and the two bevel gear-wheels N and J. The wings I', rods I², and spider I are thus rotated in one direction, while the shaft O, with its wings P, is rotated in the opposite direction. The freezing mixture is thus considerably agitated and the liquid in the chamber C is rapidly cooled or frozen. In case the receptacle Q is used for making ice-cream, then the receptacle is filled with the necessary substance, and when the shaft K' is rotated as above described the wings P agitate the ingredients for making the ice-cream. The ice-cream is readily made, as the freezing mixture surrounding the receptacle Q is constantly agitated by the wings I' and the rods I², while the ingredients for the ice-cream are agitated in an opposite direction by the wings P. In order to take out the different parts and to fill the receptacle B and the chamber C, the operator unlocks the shaft K', as above described, and then disengages the gear-wheel K from the gear-wheels J and N by sliding the shaft K' outward. The cover E can then be removed without displacing the shaft N' and its gear-wheel N. By removing the cover G access is had to the filter F, which can be removed for cleaning or renewing the filtering material. The operator by taking hold of the upper ends of the rods I² can conveniently remove the spider I and its wings I', supporting the receptacle Q, and the agitating-shaft and wings O and P. The receptacle Q is removed by unhooking the hook R', as above described.

In order to draw off the freezing mixture contained in the receptacle B, the latter is provided with an outlet-pipe B² in its bottom. Ordinarily this pipe B² is closed.

Having thus described my invention, I claim as new and desire to secure by Letters Patent—

1. A cooler and freezer consisting of an outer and inner receptacle having a chamber between them, said chamber being provided with a faucet, a ring-shaped receptacle fitting in the upper end of the chamber and having a perforated bottom, and two sets of beaters or stirrers in the inner receptacle and revolving in opposite directions, substantially as described.

2. A cooler and freezer consisting of two concentric vessels having a chamber between them, said chamber having a faucet, a ring-shaped receptacle fitting in the upper part of the chamber, a set of beaters or stirrers in the inner receptacle, a third vessel within the beaters or stirrers, and a second set of beaters or stirrers in the third vessel and rotating in an opposite direction to the first-named beaters or stirrers, substantially as described.

3. In a cooler and freezer, the combination, with a receptacle and a cover for the same, of a spider mounted in the receptacle and provided with beaters and upwardly-projecting rods, a vessel held within the beaters, a horizontal shaft mounted in the cover and provided with a bevel gear-wheel, an apertured gear-wheel to which the said rods are secured, a vertical shaft mounted in the cover, passed through the aperture of the bevel gear-wheel and having a socket in its lower end, a bevel gear-wheel on said vertical shaft, a shaft stepped in the vessel and engaging the socket of the vertical shaft, and beaters on the said shaft, substantially as described.

4. In a cooler and freezer, the combination, with two concentric vessels having a chamber between them and a cover for the vessels, of a horizontal shaft journaled in the cover and provided with a bevel gear-wheel on its inner end, a bevel gear-wheel centrally apertured, beater-arms connected to said bevel gear-wheel, a third vessel within the beater-arms, a vertical shaft journaled in the cover provided with a bevel gear-wheel and having its lower socketed end passing through the bevel-wheel of the beater-arms, a shaft stepped in the third vessel and its upper end engaging the socket of the said vertical shaft, and beaters on said shaft, substantially as herein shown and described.

5. In a cooler and freezer, the combination, with a receptacle and the agitator I I$^2$ in the receptacle, of the receptacle Q in the receptacle B and the band R and hook R′ for holding the receptacle Q in place in the agitator, substantially as herein shown and described.

6. In a cooler and freezer, the combination, with a receptacle and the agitator I I$^2$ in the receptacle, of the receptacle Q in the receptacle B, the band R and hook R′ for holding the receptacle Q in the agitator, the cap-collar S, provided with lugs S′, fitted to slide on the rods I$^2$ of the agitator, and means for securing the cap-collar to said rods, substantially as herein shown and described.

PAUL L. DERMIGNY.

Witnesses:
THEO. G. HOSTER,
E. M. CLARK.